United States Patent [19]

Moertel

[11] 4,376,365
[45] Mar. 15, 1983

[54] WASTE DISPOSER UNIT

[76] Inventor: George B. Moertel, R.D. #3, Conneautville, Pa. 16406

[21] Appl. No.: 158,139

[22] Filed: Jun. 10, 1980

[51] Int. Cl.³ .............................................. B65B 11/50
[52] U.S. Cl. ........................................ 53/555; 53/209; 53/373; 53/391
[58] Field of Search ................ 53/555, 209, 554, 228, 53/221, 224, 232, 231, 244, 373, 390, 391, 329

[56] References Cited

U.S. PATENT DOCUMENTS

| 2,637,959 | 5/1953 | Dreher | 53/555 |
| 2,885,849 | 5/1959 | Wohlman, Jr. | 53/591 |
| 2,896,387 | 7/1959 | Brock | 53/373 X |
| 3,333,395 | 8/1967 | Doucette et al. | 53/555 |
| 3,342,306 | 9/1967 | Fabbri | 53/555 X |
| 3,378,991 | 4/1968 | Anderson | 53/373 |
| 3,479,789 | 11/1969 | Harrison | 53/221 X |
| 3,665,673 | 5/1972 | Billett et al. | 53/555 X |
| 4,008,554 | 2/1977 | Hardy | 53/555 X |
| 4,063,983 | 12/1977 | Shiverdecker | 53/373 X |
| 4,164,833 | 8/1979 | Todd | 53/373 X |

Primary Examiner—Horace M. Culver
Attorney, Agent, or Firm—Anthony A. O'Brien

[57] ABSTRACT

A pet waste containment or waste matter disposer unit is disclosed as including a first sheet of sealable material for receiving the waste matter and a covering sheet of sealable material superimposed relative to the first sheet. The free marginal edges of the superimposed sheets are then sealed to each other to form a package and the now encapsulated waste material can be easily and sanitarily disposed.

11 Claims, 37 Drawing Figures

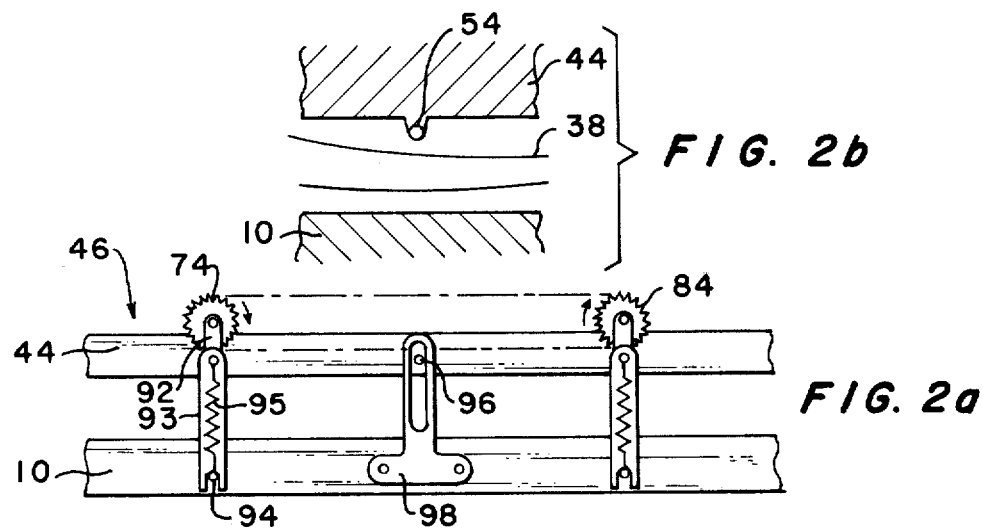
FIG. 2b
FIG. 2a
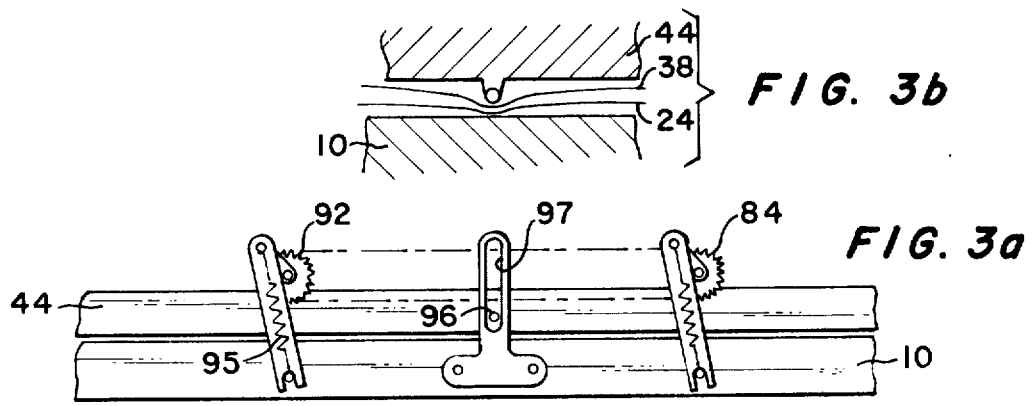
FIG. 3b
FIG. 3a
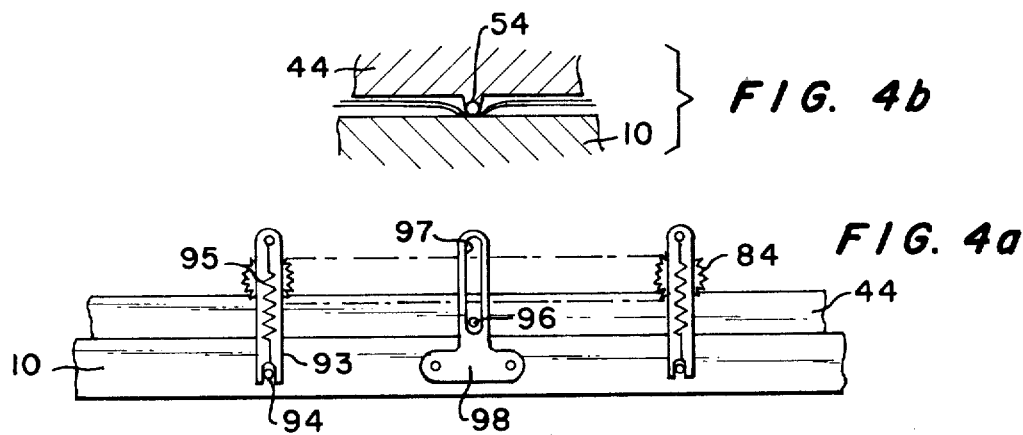
FIG. 4b
FIG. 4a

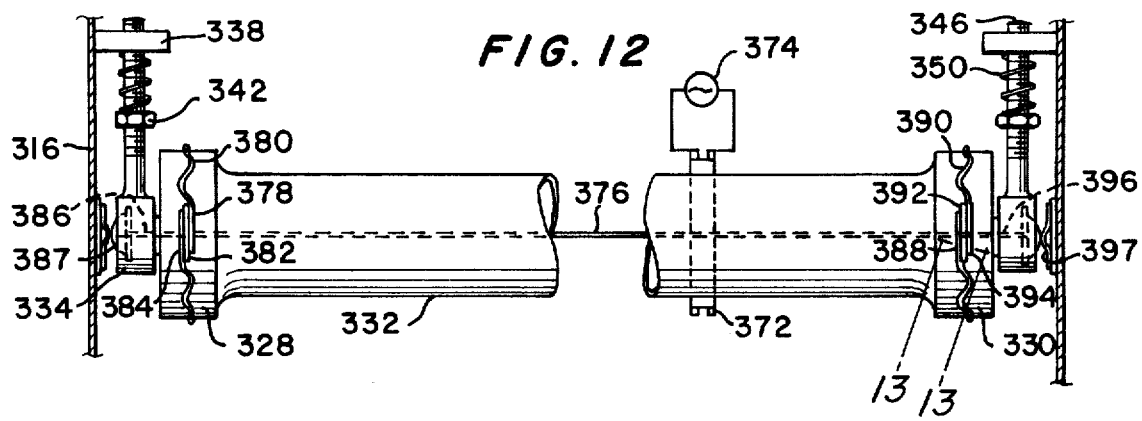
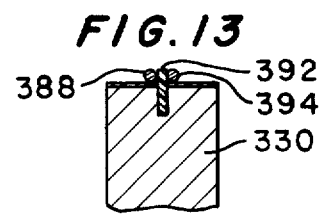
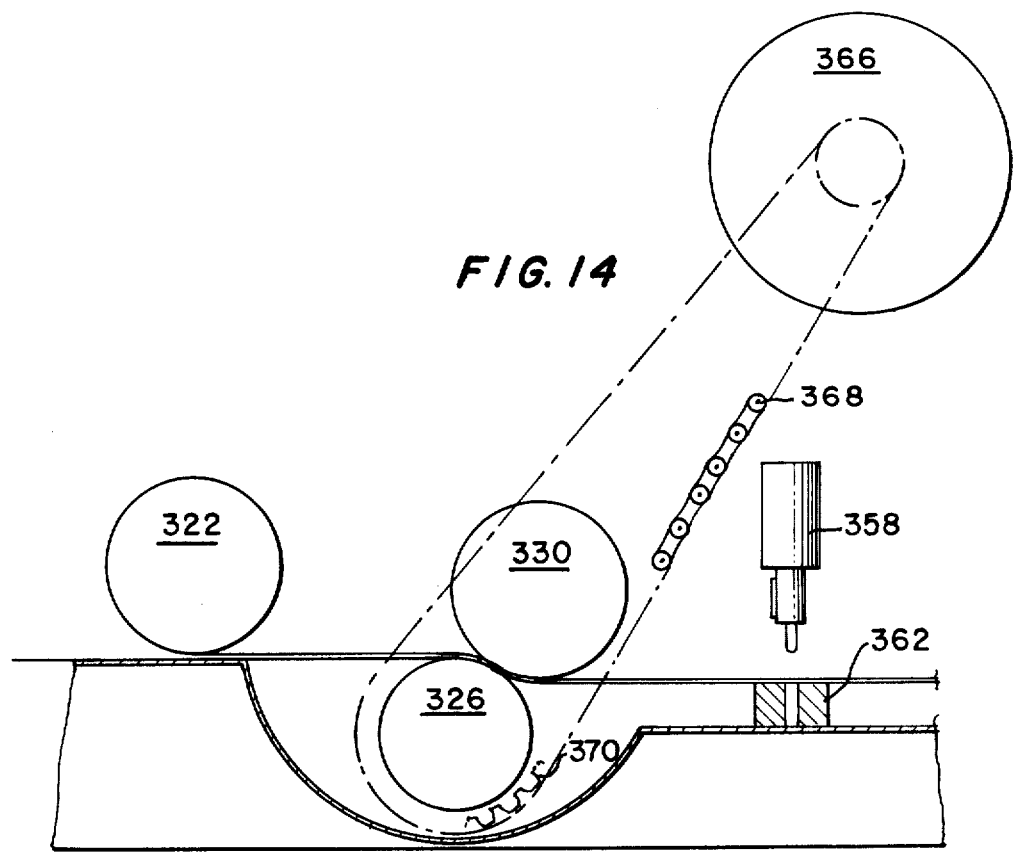

WASTE DISPOSER UNIT

BACKGROUND OF THE INVENTION

1. Field of the Invention

Pets, such as cats and dogs, are kept in high density urban areas for personal enjoyment, companionship and protecton of premises. However, these pets' access to the out-of-doors is limited by their environment and in some areas restricted by law; thus there is a need for an indoor animal waste disposer unit. To prevent obnoxious odors and unhealthy conditions, present indoor animal commodes for the pet must be frequently maintained, cleaned and replaced.

This invention relates to a pet animal waste disposer unit that encapsulates deposits of liquid and/or solid waste material into an individual easily disposable and sanitary package with a minimum of maintenance.

2. Description of the Prior Art

Prior devices for the disposal of animal waste material have generally been a waterproof tray that uses either a dry particle or litter absorbent material that eventually must be removed and replaced; or, a spray that is directed upon and cleanses those areas of the tray, upon which the pet has deposited liquid and/or solid waste material.

U.S. Pat. No. 3,154,052, No. 4,014,292, and No. 4,027,625 disclose trays that will hold a quantity of dry particle absorbent material that must be regularly cleaned, as by screening, and periodically discarded for replacement by a fresh quantity of absorbent material. On occasion, the contents of the tray, which contain both liquid and solid waste, will be accidentally spilled either when at rest, or while being transferred from the tray to a disposable container; and, even the fresh change can be spilled while being transferred to the tray. U.S. Pat. No. 3,752,121 described disposable pads upon which the solid waste rests and the liquid waste that is absorbed by the pad must similarly be removed and replaced with substantially the same inherent hazards as referenced above.

U.S. Pat. No. 3,227,138 discloses an animal commode in which the platform for receiving the waste material is cleansed by a jet of liquid spray. Similarly, U.S. Pat. No. 3,798,988, No. 3,842,803 and No. 4,050,414 have a continuous belt upon which the liquid and solid waste material is deposited, the belt being then moved to a second station in the course of which the solid waste material is deposited into a tray after which a jet of liquid spray cleanses the belt of any remaining waste material with the liquid of the spray dripping from the belt into the tray to intermix with the liquid and solid waste material during temporary storage.

The above prior art calls for the deposit of the waste material in the animal commode, temporary storage in an exposed condition, prior to removal of the tray containing the intermixed liquid and solid waste material. Storage, maintenance, cleansing and removal of the waste material is odoriferous, obnoxious and unsanitary.

SUMMARY OF THE INVENTION

The invention is summarized as an animal waste disposer unit that includes at least one sheet of sealable material located at a first station to form a bed and wall portion, either of which can receive a deposit of waste material. Once the waste is deposited on the sheet, mechanisms are actuated to superimpose the wall portion relative to the bed portion with the waste material located intermediate thereof, after which the marginal areas of the wall portion and the bed portion are sealed together to encapsulate the waste material therebetween in an odorless, sanitary package. Upon a successive deposit of waste material by the pet, the previously encapsulated waste material package at the sealing station is advanced, and a cutting device can be actuated to sever the previously encapsulated waste material package, or the successive encapsulated packages can be wound upon a reel for storage, and later disposed.

OBJECTS OF THE INVENTION

An object of the present invention is to construct a pet waste disposer unit with automatic disposal of waste matter.

Another object of this invention is to encapsulate animal waste matter in a sealed package for subsequent disposal purposes.

It is another object of this invention to preclude leakage of animal waste matter from an encapsulated package as well as to preclude leakage of odor therefrom.

The present invention has a further object in that a pet waste disposer unit is automatically operated to feed packaging film from a supply of sealable material.

BRIEF DESCRIPTION OF THE DRAWINGS

FIG. 2a is a partial elevation veiw showing certain details of FIG. 1 in first operating positions;

FIG. 2b is a diagrammatic representation of the details of FIG. 2a;

FIG. 3a is a partial elevation view similar to FIG. 2a but showing the details in second operating positions;

FIG. 3b is a diagrammatic representation of the details of FIG. 3a;

FIG. 4a is a partial elevation view similar to FIGS. 2a and 3a but showing the details in third operating positions;

FIG. 4b is a diagrammatic representation of the details of FIG. 4a;

FIG. 12 is a front elevation view of a detail of FIG. 10;

FIG. 13 is a cross-sectional view of a detail taken along line 13—13 of FIG. 12;

FIG. 14 is a side elevation view of the drive assembly as viewed from the right hand side of FIG. 9;

DESCRIPTION OF THE PREFERRED EMBODIMENTS

Figure 1:
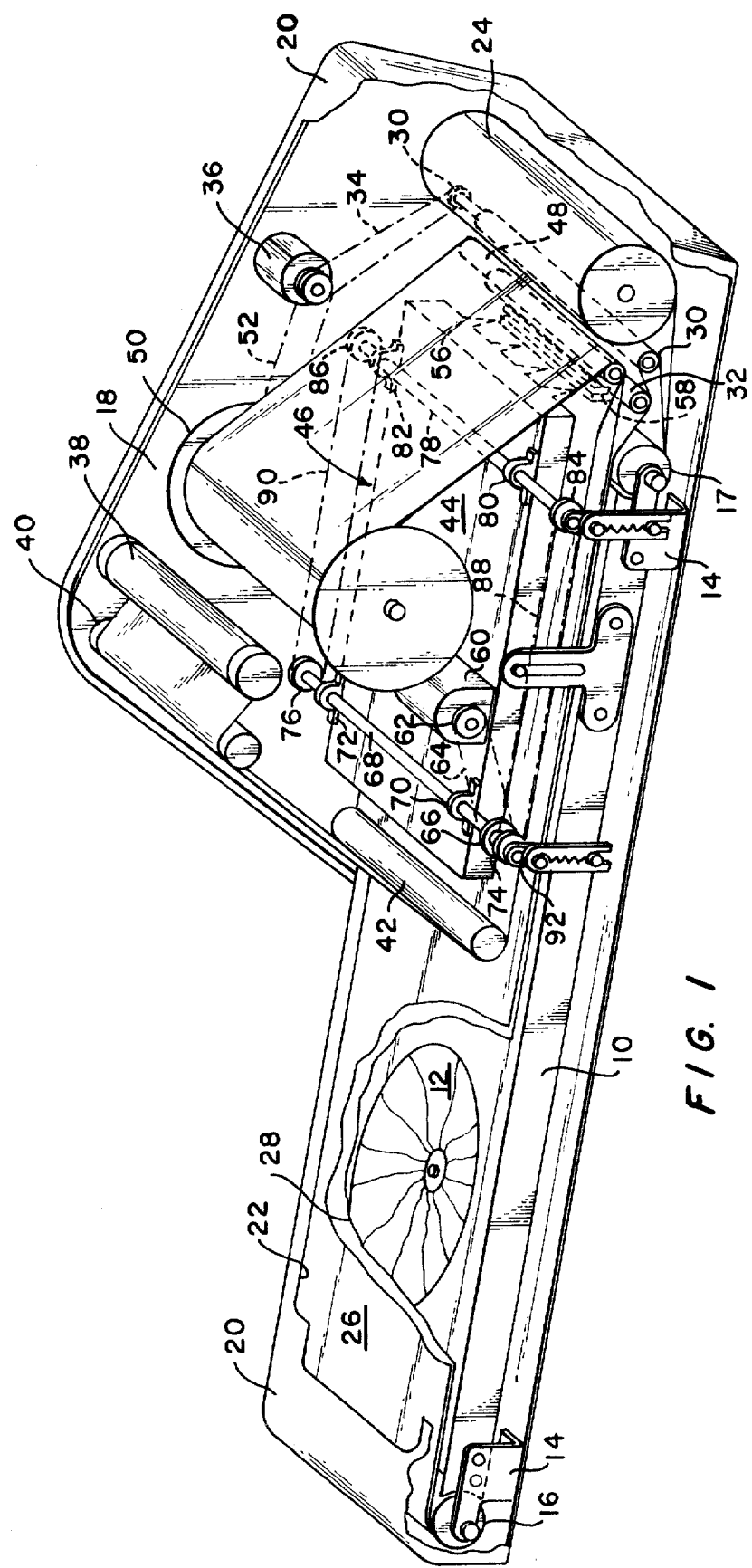
FIG. 1 is a perspective view with parts broken away of an animal waste disposer unit embodying the present invention.
Figure 5:
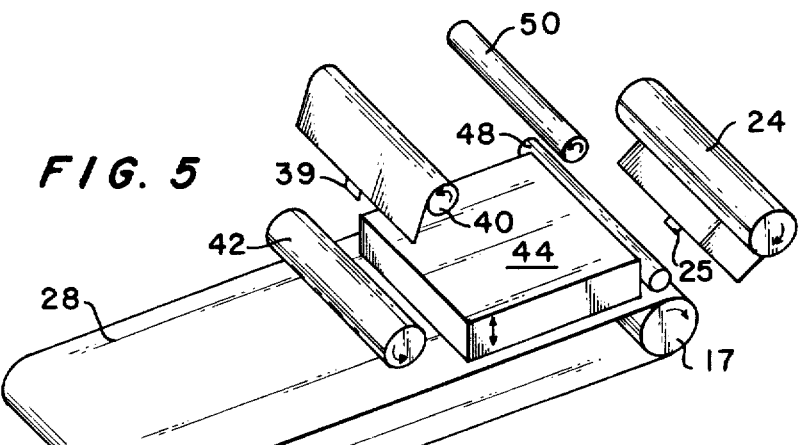
FIG. 5 is an exploded perspective view of certain details of FIG. 1.

As is illustrated in FIG. 1, the present invention is embodied in an automatically operated pet waste matter disposer unit including a rigid, flat elongated tray made of particulate board or the like, the longitudinal central portion of which is formed as a shallow dish shaped portion 12. A support leg 14 is fastened to each of the four corners of the tray 10 to define a surface support for the tray 10 as well as an axle bearing for mounting a pair of rollers 16 and 17 at each end of the tray 10. A vertically disposed support wall 18 is secured perpendicularly to one side of the tray 10 and a similar support wall (not shown) is similarly secured to the opposite side of the tray 10. A housing cover 20 encompasses the side walls 18 and the space therebetween; a rectangular opening 22 in the front portion of the housing cover 20 presents a large surface area exposed over the dish shaped portion 12.

A supply roll 24 of film is journalized between the opposite side walls 18; the film may be any type of moisture resistant, continuous sheeting of single ply, laminate, or coextruded materials; in this particular embodiment, the film is a low density polyethylene which is preferably non-transparent. Absorbent portions 26 are equally spaced along the film 24 such that fresh absorbent material 26 is located in the rectangular opening 22. The absorbent material may be any suitable material, such as newsprint, kraft paper, flocked material, etc.

A continuous belt 28 preferably of high melt temperature thermoplastic impregnated fabric (or any reasonably durable thin belting material or fabric capable of withstanding 300° F. without degrading) is operatively disposed to move over rollers 16 and 17, about drive roller 30 and under idler roller 32. As is apparent from the left hand portion of FIG. 1, the belt slides along the top surface of the tray 10.

A suitable chain drive 34 connects the drive roller 30 to a constant speed drive motor 36 which has a low RPM output so as to move the continuous belt 28 slowly over the associated rollers 16, 17 and 32.

A second supply roll 38 of film is intermediately located in the top portion of the housing cover 20 and journalled between the side walls 18. This film is made of the same material as film 24, i.e., a low density polyethylene with or without any absorbent material. It is not necessary that the two films be identical, but only that they be sufficiently compatible for sealing purposes as is described below. The film from supply roll 38 extends around an upper idler roller 40, around a lower idler roller 42, underneath a rectangular plate 44 of a rack mechanism 46, around an idler roller 48, and then onto a storage reel 50. The film from the first supply roll 24 is in contact with the continuous belt 28 and is moved simultaneously therewith so that it joins in a simultaneous movement with the second film 38 to the storage reel 50. Each of the supply rolls 24 and 38, the idler rollers 32, 40, 42 and 48, the drive roller 30, and the driver storage reel 50 are journalled between the side walls 18. A suitable slip clutch and drive chain 52 connects the storage reel 50 to the drive motor 36 whereby the storage reel 50 rotates at a speed sufficient to reel the sealed waste matter.

Figure 6:
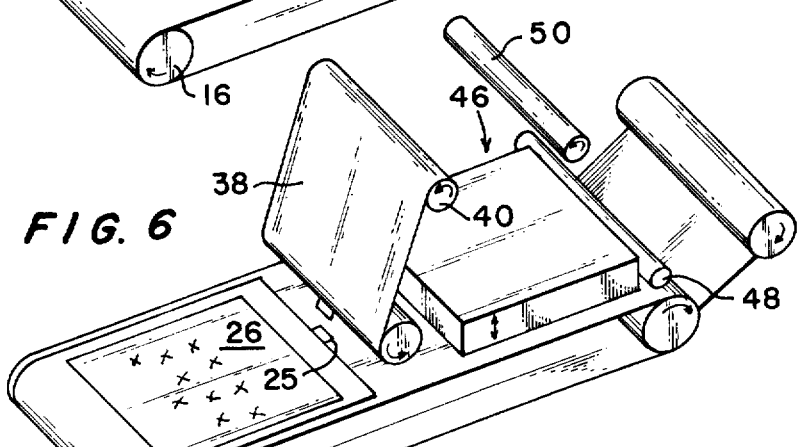
FIG. 6 is an exploded perspective view similar to FIG. 5 showing the details in advanced conditions.
Figure 7:
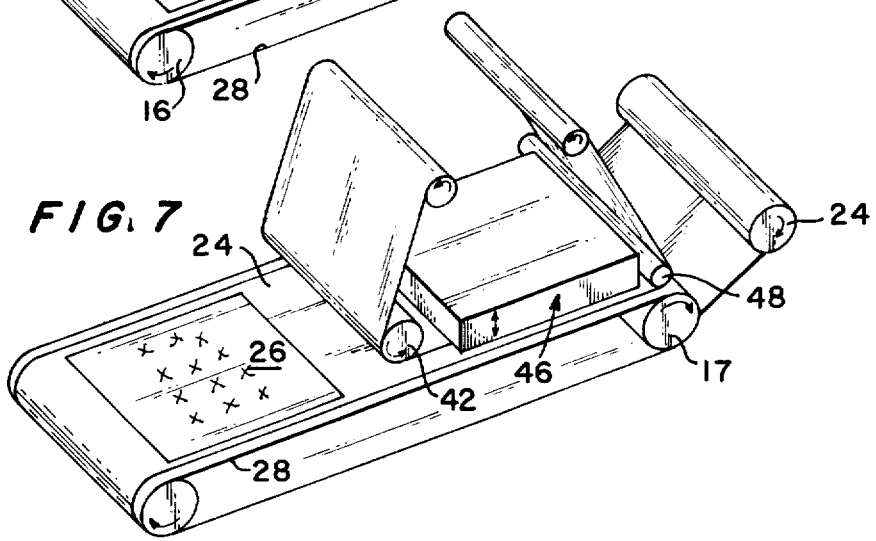
FIG. 7 is an exploded perspective view similar to FIG. 6 showing the details in further advanced conditions.

During initial assembly an adhesive tab 25 on the leading end of film 24 is secured to belt 28 and moves therewith to the position shown in FIG. 6 where the free ends of the films 24 and 38 are secured together by joining adhesive tabs 25 and 39, on their respective leading edges. The adhesive tabs 25 and 39 are then fixed to the storage reel 50 and wound thereupon actuation of the device.

The undersurface of the rectangular plate 44 includes a device to seal the two polyethylene films together in the form of an electrically operated hot wire 54; see FIGS. 2b, 3b and 4b. The hot wire 54 is secured by any suitable means and is arranged in a generally rectangular pattern so as to be disposed slightly within the perimeter of the rectangular plate 44. The hot wire 54 defines a rectangle which is slightly larger than the outline of the absorbent material 26 so that adjacent portions of the two films 24 and 38 may be heat sealed by the hot wire 54 to form a package.

The hot wire 54 is mounted for unitary vertical movement of the rectangular plate 44 and a perforating knife 56 having a serrated edge is simultaneously actuated with vertical movement. As viewed in FIG. 1, the perforating knife 56 is secured to the rear or right hand edge of the plate 44 in a location beyond the right hand belt roller 17. Adjacent portions of successive packages rest on a knife platen 58 having a central slot or opening through which the serrated edge of the knife 56 passes during its downward vertical movement. The platen 58 is securely mounted in the housing cover 20 and extends between the two side walls 18.

On the forward or left hand portion of the rectangular plate 44 is fixedly mounted a gear motor 60 having an output sprocket 62 extending therefrom. A drive chain 64 is connected between the sprocket 62 and a drive gear 66 which is fixed to an axle 68 for unitary rotation therebetween. The axle 68 is rotatably mounted in a pair of journal bearings 70 and 72 that are fastened to the top surface of the rectangular plate 44 adjacent the forward side edges thereof.

A pair of sprocket wheels 74 and 76 are keyed or otherwise fixed on the axle 68 adjacent the bearings 70 and 72, respectively, but are spaced slightly from the corresponding side edges of the rectangular plate 44. On the rearward or right hand portion of the rectangular 44 is a complementary axle 78 rotatably mounted in a pair of journal bearings 80 and 82 that are fastened to the top surface of the rectangular plate 44 adjacent the rearward side edges thereof. A pair of sprocket wheels 84 and 86 are keyed or otherwise fixed on the axle 78 adjacent the bearings 80 and 82, respectively, but are spaced slightly from the corresponding side edges of the rectangular plate 44. A drive chain 88 is connected between the two sprocket wheels 74 and 84, while a drive chain 90 is connected between the other two sprocket wheels 76 and 86. It should be understood that with proper dimensioning of the components, the present invention may use only a single chain, such as 88, and eliminate the other chain 90 and its sprocket wheels 76 and 86.

A crank arm 92 on the end of the axle 68 outside of the sprocket wheel 74 is fixed for unitary rotation with the axle 68 and wheel 74 and is disposed so as to be on the outside of the plate 44 and tray 10. The free end of the crank arm 92 is pivotally connected to the upper end of a link 93 which has a lower slotted end straddling a pin 94 fixed to the tray 10. A coil spring 95 is mounted in tension between the upper end of the link 93 and the pin 94 whereby the link 93 is biased for pivotal mounting on the pin 94. Thus the rectangular plate 44 is moved downward from FIG. 2a through FIG. 3a to a sealing position shown in FIGS. 4a and 4b. To assure a smooth even movement of the plate 44, the biased crank and link arrangement is similarly provided for each of the other three sprocket wheels, 76, 84 and 86 so that a separate description thereof is being omitted.

True vertical movement of the rectangular plate is further assured by a pin and slot bracket including a pin 96 fixed to the side of the rectangular plate 44 and protruding through the slot 97 in the vertical leg of an inverted T shaped bracket 98 which has its horizontal leg fixed to the tray 10. During vertical movement of the rectangular plate 44, any transverse movement is precluded because of the confinement of the pin 96 in the slot 97.

In operation of the above described pet waste disposer unit, it is understood that the pet is placed on the forward end of the device and trained to so accommodate himself. Once the waste matter is disposed on the absorbent material 26, the pet waste disposer unit is operated automatically as by a push button or suitable sensor, etc. to energize the gear motor 60 and drive motor 36. The drive motor 36 will thus rotate the drive shaft 30 and the storage reel 50 causing rotation of the belt 28 as well as the take-up of the storage reel 50. Once the portion of the belt with the absorbent material 26 is located under the rectangular plate 44, suitable circuitry mechanism deenergizes the motor 36 and at the same time energizes the gear motor 60 causing the gear 66 to rotate the sprocket wheel 74 (as well as the other three sprockets 76, 84 and 86) to be driven in a clockwise direction as viewed in FIG. 2a. The crank arm 92 moves from its lowermost position in FIG. 2a to its uppermost position in FIG. 4a causing the rectangular plate 44 to be moved downwardly so as to rest on the top of the two films 24 and 38. At this point, the pressure from the rectangular plate on the two films 24 and 38 stop the longitudinal movement thereof and, through any suitable electrical circuitry, the hot wire 54 is energized causing the periphery surrounding the absorbent material 26 to be heat sealed and thus form a disposable sealed package. The gear motor 60 operates continuously so that, after the sealing operation, the crank arm mechanism returns to its lowermost position as represented in FIG. 2a.

During the heat sealing operation, the perforating knife 56 perforates the films 24 and 38 to define a tear strip between adjacent sealed packages. The mechanism is now in its original condition so that a new cycle can be performed as by operating a push button switch.

It should be noted that the present device may be rendered completely automatic so as to be triggered as by switch, heat sensing devices, etc. whereupon the waste matter or animal functions to operate the mechanism after a suitable period of time.

Figure 8:
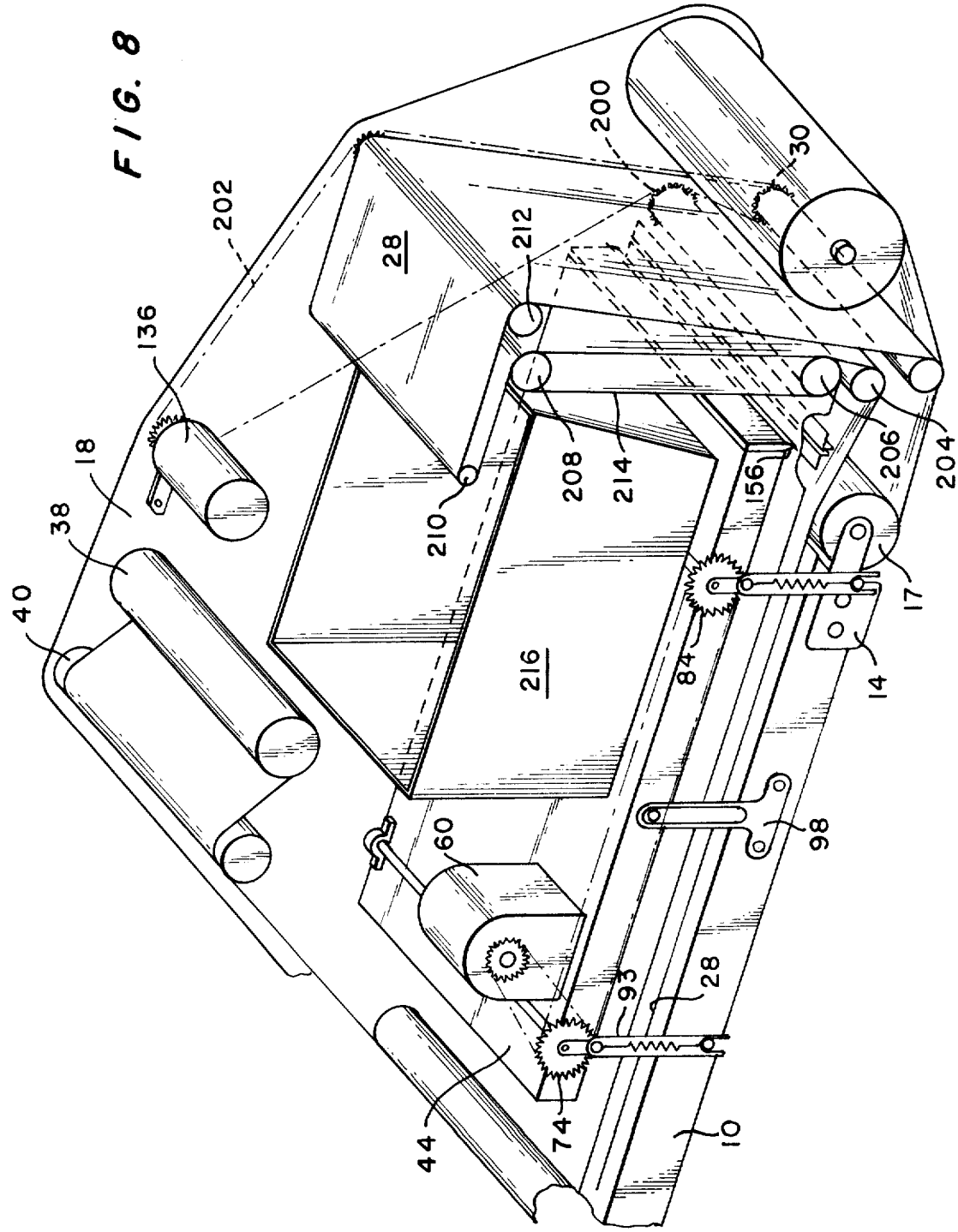
FIG. 8 is a partial perspective view of an embodiment of FIG. 1.

FIG. 8 represents another embodiment of the present invention wherein the encapsulating sealed packages of waste matter are individually severed from each other and are automatically deposited into a storage container 216. As the majority of the components in FIG. 8 are similar in structure and operation to the embodiment illustrated in FIG. 1, a detailed description of the identical components is being omitted for the sake of brevity and only the new components are being described hereinafter. Thus the severing knife 156 on the right end of the rectangular plate 44 will completely sever the films 24 and 38 to form individual packages. The drive motor 136 drives a pair of drive rollers 30 and 200 by means of an endless chain drive 202. The continuous belt 28 moves vertically upward from the idler roller 204 between the two rollers 206 and 208, then reverses itself around idler roller 210 and returns about idler roller 212 to the drive roller 30.

With this arrangement, the severed encapsulated package progresses from the severing operation under the drive roller 206 and then vertically upward between the belt 28 and a second endless belt 214 which is disposed around the two rollers 206 and 208; the severed package then continues around the idler 208 from which it drops into the open top of the container 216. Consequently, the encapsulated sealed package is automatically moved into the storage bin which may be manually removed according to desired accumulation.

In both the embodiments of FIG. 1 and FIG. 8 the present invention has the particular advantage of storage of the waste matter as long as is permitted since the sealed encapsulated package precludes leakage of the waste matter as well as any odor associated therewith.

The embodiment of the beltless waste dispose unit illustrated in FIGS. 9-26 includes a rigid elongated tray having a generally rectangular support 310 with a containment wall 312 around its periphery to define a traylike configuration. A front housing cover 314 is removably secured to the support 310 adjacent its front end portion and a rear housing cover 316 is removably secured to the support 310 adjacent its rear end portion.

In this embodiment, the type of material and construction of certain components are similar to those utilized in the embodiment of FIGS. 1-7 so that such materials and/or constructions will not be repeated for the sake of brevity. However, the embodiment of FIGS. 9-26 does not include an endless belt (such as 28); a supply roll 318 of film (similar to roll 24) is journalled between the opposite walls of the front cover housing 314 and absorbent material (similar to material 26) may be spaced along the film material as is shown in FIGS. 10 and 11.

Figure 10:
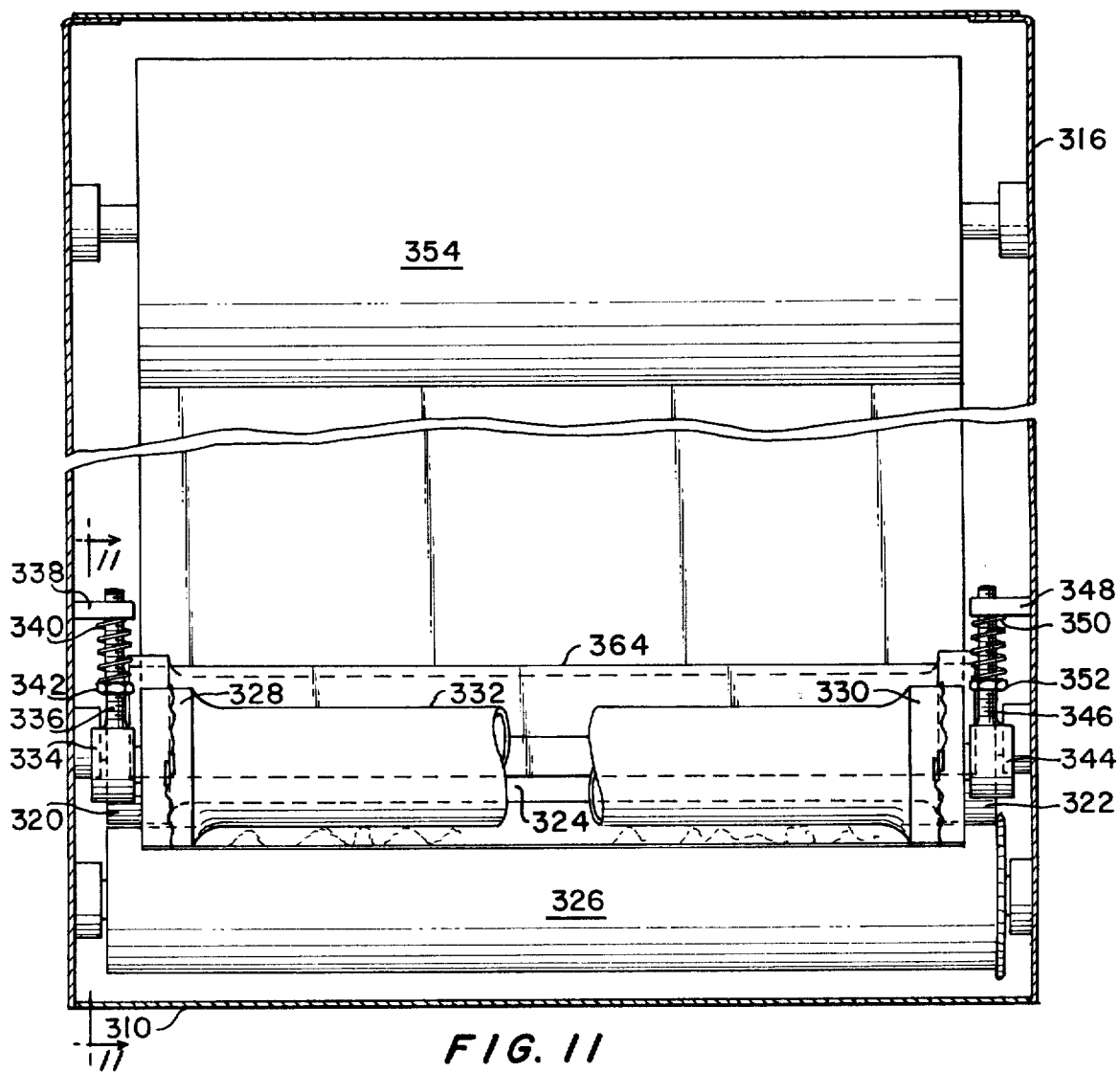
FIG. 10 is an enlarged cross-sectional view taken along line 10—10 of FIG. 9.
Figure 11:
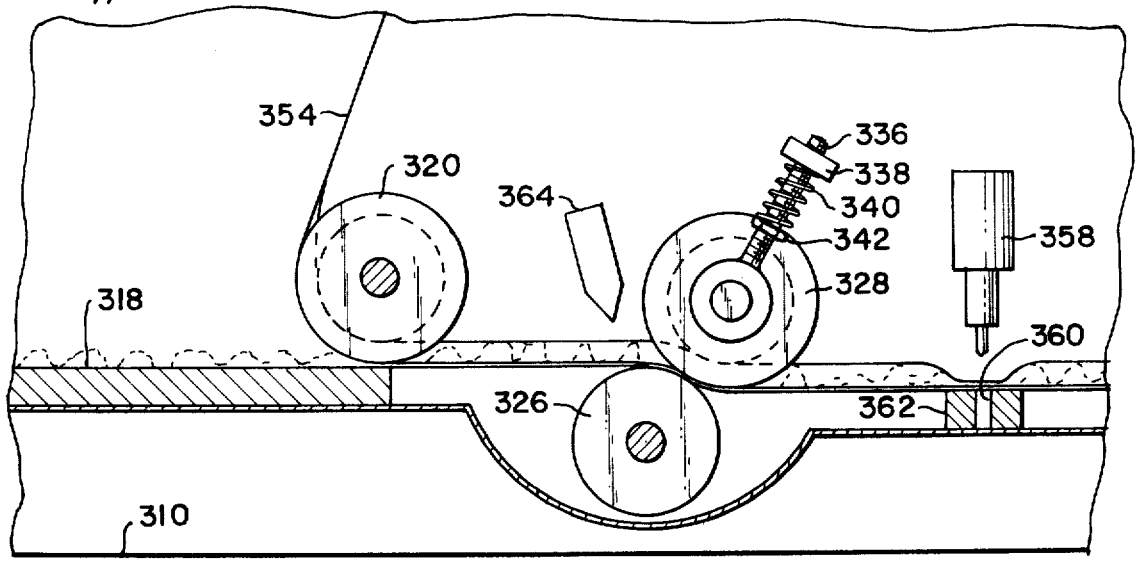
FIG. 11 is a cross-sectional view taken along line 11—11 of FIG. 10.

The sealable material film for lower supply roll 318 extends across the intermediate uncovered portion of support 310 and underneath an idler roller; as is apparent from FIG. 10, the idler roller consists of two spaced pressure wheels 320 and 322 of substantially greater diameter than an interconnecting axle 234, all of which are journalled as a unit in the opposite side walls of the rear cover housing 316 for counterclockwise rotation as viewed in FIG. 11. The sealable material extends from the idler roller over the top of a driven roller 326 which has a diameter smaller than the idler roller wheels 320 and 322. The driven roller is journalled between the opposite side walls of the rear cover housing 316 for clockwise rotation as viewed in FIG. 11.

The sealable material is pressed against the driven roller 326 by an edge sealing roller in the form of two spaced pressure wheels 328 and 330 which are of the same diameter as the wheels 320 and 322 and which are joined by a smaller diameter interconnecting axle 332. The pressure wheel 328 has its axle end rotatably mounted in a journal box 334 carried on the end of an adjustment bolt 336 which has an opposite end threaded through a mounting bracket 338 fixed to a side wall of the cover housing 316. A coil spring 340 is mounted in compression between the bracket 338 and a nut 342 intermediately threaded on the adjustment bolt 336. The opposite pressure wheel 330 is similarly mounted with the identical components, viz, journal box 344, adjustment bolt 346, mounting bracket 348, coil spring 350 and nut 352. With the above arrangement, the pressure wheels 328 and 330 are spring biased toward adjacent portions of the driven roller 326; the adjustment of the bolt 336(346) in the mounting bracket 338(348) permits adjustment of the space between the driven roller 326 and the pressure wheel 328(330) while adjustment of the nut 342(352) on the bolt 336(346) permits adjustment of the biasing force urging the pressure wheel 328(330) toward the drive roller 326.

An upper supply roll 354 is journalled in between the opposite side walls of the rear cover housing 316 in the upper portion thereof. The film of sealable material 354 extends downwardly under the idler roller wheels 320 and 322 and on top of the lower sealable material 318 and continues therewith between the driven roller 326 and the pressure wheels 328 and 330, thence to a severing or perforating station 356. It is to be understood that a severing blade or hot wire cutter may be utilized in place of or in conjunction with the perforation station 356. Perforation of the sealable material is accomplished by a plurality of punches 358 aligned in a row transverse to the travel of the sealable material. These punches may be manually or automatically operated so as to protrude the sealable material into aligned holes 360 in a fixed block 362.

Spaced above the driven roller 326 and extending along its longitudinal length is a heat sealing blade 364 which may be actuated by any suitable means to move toward the driven roller 326. The blade 364 defines a cross sealer which may be actuated automatically by any type of a sealer drive such as a solenoid in response to a signal from a relay or the like; movement of the cross sealer 364 may also be utilized to cycle the heating element. The cross sealer 364 is adapted to operate in accordance with any suitable timing or indexing mechanism to cross seal the two sealable films 318 and 354 together as they pass over the driven roller 326.

A drive motor 366 is mounted on one of the side walls of the rear cover housing 316 and is connected by a chain drive 368 to a sprocket 370 mounted on the right hand end of the driven roller 326 (see FIG. 14). A suitable master switch controls the on-off operation of the drive motor 366.

As is apparent from FIG. 12, the edge sealing of the sealable material is a continuous system which uses slip rings 372 or mercury contacts for connecting the sealing wheels to a 12-volt source 374. The slip rings are fixed to the axle 332 for rotation therewith and are electrically connected to an electrical conductor 376 which extends from end to end inside the axle 332; at the left hand end of axle 332, the conductor 376 engages a terminal 378 of heating wire 380 which is integral with an undulating ring around the insulated periphery of the wheel 328. An insulating strip 382 separates the terminal 378 from a terminal 384 on the other end of the heating wire 380 and is electrically connected to a lead wire 386 which in turn is electrically connected to a pair of ground contacts 387. At the right hand end of axle 332, there is a similar arrangement for the conductor 376 including a terminal 388, heating wire 390, insulating strip 392, terminal 394, lead wire 396, and a pair of ground contacts 397.

FIGS. 15 through 24b illustrates the series of steps taken by the cross-sealing edge-sealing and perforation of the sealing materials into a disposable package. FIG. 25 is an enlarged end view similar to FIG. 11 but showing a diagrammatic representation of the additional components associated with the cross-sealing, edge sealing, and perforation of the sealing material into the sealed packages illustrated in FIGS. 18a through 24b. As is illustrated in FIG. 25, the cross-sealer heat sealing blade 364 reciprocates in a generally vertical direction as by a solenoid actuation or the like to effect a cross seal whereby the films 318 and 354 are pressed against the roller 326 and are sealed together. Movement of the two films transverse to the roller 326 is guided by an L-shaped resilient bracket 400 which is supported at its top portion by being attached or welded to an adjacent wall portion of the containment wall 312. The lower edge of the bracket 400 retains the traveling films 318 and 354 in contact with the roller 326. A similar retainer bracket 400 (not shown) is located on the opposite end of the roller 326 to retain the right hand end of the film 318 and 354 (as viewed in FIG. 10) adjacent such opposite end of the roller 326. The retainer bracket 400 operates ahead of the cross sealer 364 while an edge wire guide 402 operates after the cross-sealer 364. The wire guide 402, with a similar wire guide on the right hand end (not shown), is located outside the edge-sealing wheel 328 (330); the guide 402 is generally L-shaped with an intermediate sloping portion clearing the adjacent portion of roller 326 and with an upwardly vertical portion terminating after the edge-sealing wheel 324. A knife edge scraper bracket 404 is attached to the tray 10 in such position as to scrape the film package away from driven roller 326.

Figure 26:
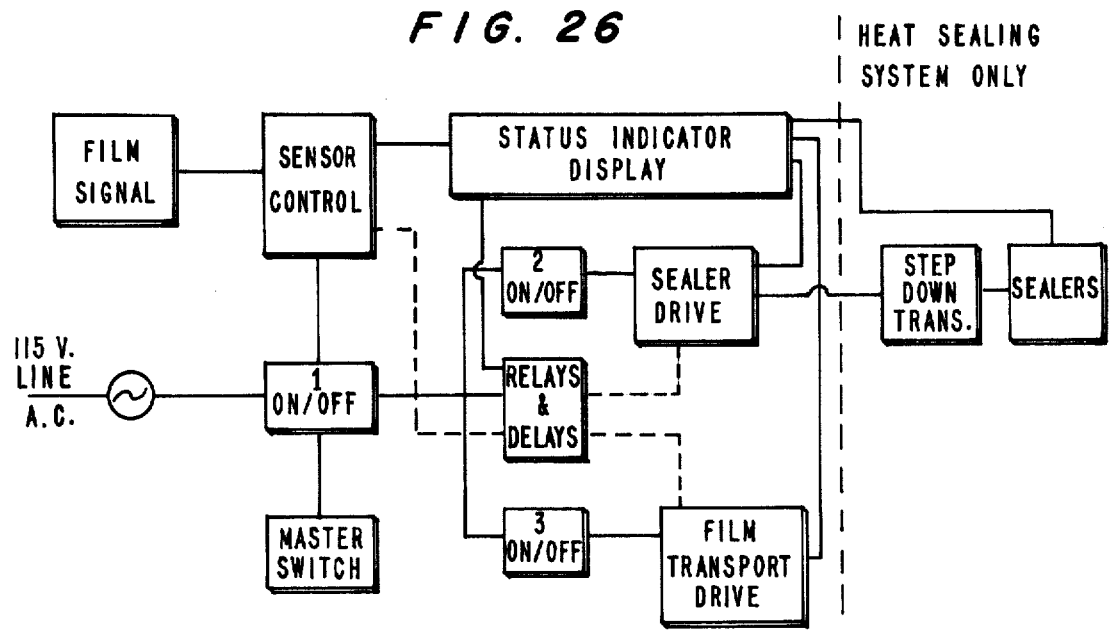
FIG. 26 is a schematic diagram of an automatic control system for the various components of the embodiment of FIGS. 9–25.

The control sequence of the schematic diagram of FIG. 26 is described hereinafter in conjunction with a description of a sequence of operation of the embodiment illustrated in FIGS. 9–25.

Figure 15:
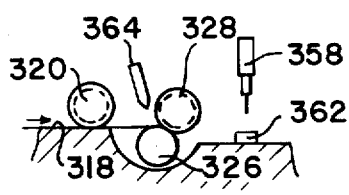
FIG. 15 is a schematic representation of the idler and driven rollers, which move the sealable material, showing the loading of the lower film.
Figure 16:
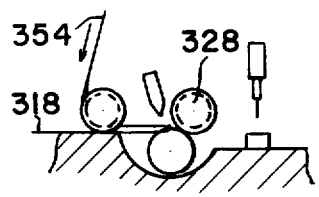
FIG. 16 is a schematic representation similar to FIG. 15 but showing the loading of the upper film.
Figure 17:
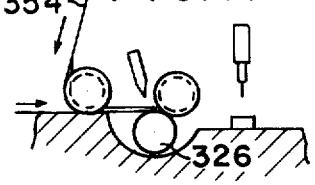
FIG. 17 is a schematic representation substantially the same as FIG. 16, but with energization of the drive roll.

As is shown in FIG. 15, the loading of the lower sealable film 318 is inserted under the idler wheel 320 (and 322); then the upper sealable film 354 (FIG. 16) is also inserted under the idler wheel 320 (and 322) so as to cover the lower film 318. FIG. 17 shows the two films being jointly extended to engage the driven roller 326. The two films 318 and 354 are then held in a pinching position with their leading edges being adjacent the contact point of the driven roller 326 and the pressure wheels 328 and 330; the two films are held in this position by the retainer brackets 400 (FIG. 25).

FIG. 17 represents ready position of the device for automatic control by the control circuit of FIG. 26. It is to be understood that the actual circuit diagram may take any suitable form and the particular selection and arrangement of the sensors, switches, relays, displays, transformers and drivers may be varied according to installation and electrical code requirements. To commence automatic operation, the master switch is actuated manually causing the on/off switch 1 to be placed in the "on" condition and electrical circuits are completed from the 115 V supply line through the on/off switch 1 to the sensor control, on/off switches 2 and 3, the relays and delays, and thence the status indicator display. At this time the on/off switch 2 completes the electrical circuit for energizing the sealer drive, the step down transformer and the sealers, while the on/off switch 3 energizes the film transport drive; appropriate energization signals are also displayed on the status indicator display.

Figure 9:
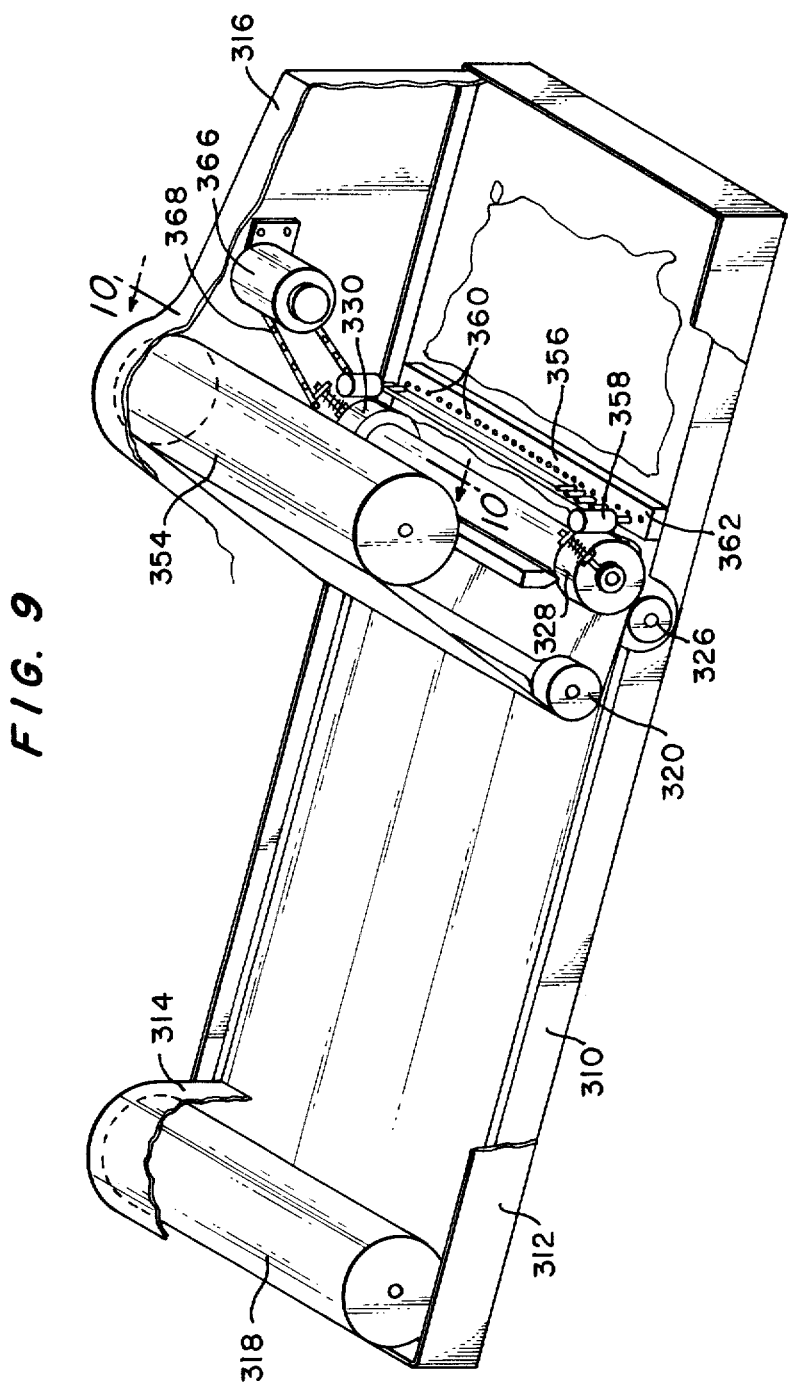
FIG. 9 is a perspective view with parts broken away of another embodiment of FIG. 1.
Figures 18, 18A:
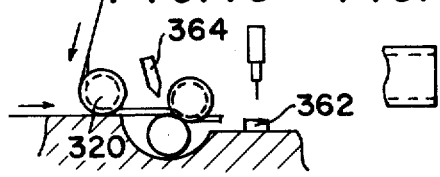
FIG. 18 is a schematic representation similar to FIG. 17 but showing the first step of edge sealing.
FIG. 18a is a partial plan view of the edge-sealed package shown in FIG. 18.

Energization of the film transport drive causes the drive motor 366 through the drive chain 368 to rotate the driven roller 326 in a clockwise direction as viewed in FIG. 9. At the same time the edge sealers 380 and 390 are heated so that each edge of the films 318 and 354 are sealed as they are driven between the drive roller 326 and the pressure rollers 328 and 330 on which the edge sealing wires are carried. As the edge sealed films 318 and 354 pass from the driven roller 326, they are lifted off the roller 326 by a knife edge 404 which is fixed to an adjacent portion of the tray 10. As the edge sealed films pass from the pressure rollers 328 and 330, they are guided along their edges by the wire guides 402. The condition of the films 318 and 354 are now as represented in FIGS. 18 and 18a; as shown in FIG. 18a, the edge sealing has been applied to each edge of the films 318 and 354.

Figures 19, 19A:
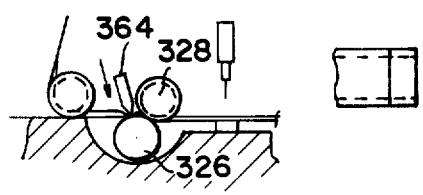
FIG. 19 is a schematic representation similar to FIG. 18 but showing the next step of initially cross-sealing the package.
FIG. 19a is a schematic representation similar to FIG. 18 but showing the next step of initially cross-sealing the package.

The delay mechanism now stops the film transport drive and energizes the sealer drive whereby the cross sealer 364 is pressed against the films 318 and 354 on the roller 326 as shown in FIG. 19 causing a cross seal to be applied thereon. The cross sealer 364 is an instantaneous reciprocating operation so that the sealer 364 automatically returns to its upper ready position and is not continuously energized.

As shown in FIG. 19a, the edge seals and the cross seals have been applied to approximately one-half of the to-be-sealed package. The waste disposal unit is now in a loaded condition and is prepared for normal cycling operation.

It should be noted that the waste disposal unit may operate with the tray upper surface and the film 318 traveling thereacross located on the same plane as the plane of the cross sealing level and that the unit will function with or without the absorbent material applied to the film 318. A variety of waste retaining means may be employed to prevent side flow of liquid waste; such means are applied to the upper surface of the lower film 318 and include surface irregularities in the shape of wrinkles, cross patterns, dimples, and local depressions. The side flow of liquid waste may also be prevented by altering the wettability of the film 318.

As described above, the cross-sealing and edge sealing are accomplished by electrical heat sealing means. The cross sealing and edge sealing may also be accomplished by adhesive means in the form of cross adhesive strips and edge adhesive strips. In addition one of the cross sealing or edge sealing steps may be accomplished by electric heat sealing and the other step accomplished by adhesive sealing. If adhesive sealing alone is used the energization of the sealer drive in FIG. 26 is sufficient to operate a cross sealing bar while edge sealing pressure rollers 328 and 330 cooperating with the driven roller will accomplish the two edge sealing operations. With such an arrangement there is no need for the step-down transformer and sealers shown on the right hand side of FIG. 26.

Normal cycling of the waste disposer unit from the position of the components shown in FIG. 19 commences when the film signal transmits a signal to the sensor control; such film signal may be made by any suitable device associated with the lower film 318 and the tray 10 to indicate that an animal on the film 318 has left or been removed therefrom. A control signal from the sensor control in FIG. 26 is then sent to the status indicator display to indicate an "on" cycle; a control signal is also sent to the relays and delays devices.

Figures 20, 20A:
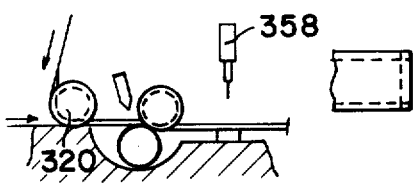
FIG. 20 is a schematic representation similar to FIG. 18 but showing the components in their ready position for a signal to cycle.
FIG. 20a is a partial plan view of the cross-sealed package of FIG. 20.

FIG. 20 illustrates the position of the operating components when a signal is received to actuate the automatic operation. FIG. 20a shows the sealed package end after the relays and delays of FIG. 26 energize the severing station 356 whereby the portion between the two adjacent cross seals (FIG. 19a) has been transversely cut in half so that one half will remain with each portion of the sealed package.

Figures 21, 21A:
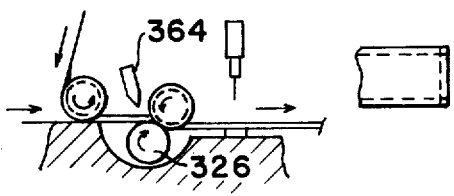
FIG. 21 is a schematic representation similar to FIG. 20 but showing the indexing of the sealable material, the edge sealing thereof and the initial cross-sealing thereof.
FIG. 21a is a partial plan view of the initially edge-sealed and cross-sealed package of FIG. 21.

FIGS. 21 and 21a represent the continuing of the edge sealing of the driven roller 326 and the edge seals 380 and 390.

Figures 22, 22A:
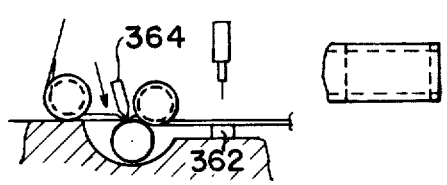
FIG. 22 is a schematic representation similar to FIG. 21 but showing the final cross-sealing of the package.
FIG. 22a is a partial plan view of the package after it receives the final cross-seal.

FIGS. 22 and 22a represent the stopping of the edge sealing and the application of the second cross seal by the cross sealer 364.

Figures 23, 23A:
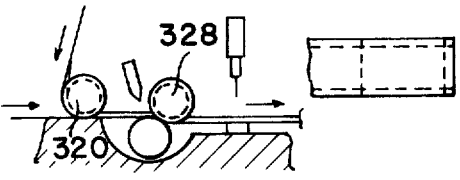
FIG. 23 is a schematic representation similar to FIG. 21 but showing the continued edge sealing of the sealable material.
FIG. 23a is a partial plan view of the package after it receives its cross-seals but before severance thereof from the sealable material strips.

FIGS. 23 and 23a represent the continuing of the edge sealing as described above.

Figures 24, 24A:
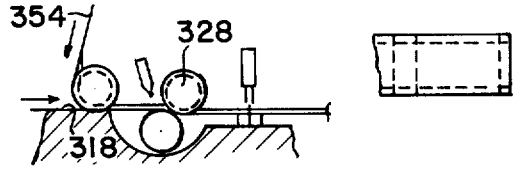
FIG. 24 is a schematic representation similar to FIG. 23 but showing the cross-sealing of the sealable material into two successive unsevered packages.
FIG. 24a is a partial plan view of the unsevered package of FIG. 24.
Figure 25:
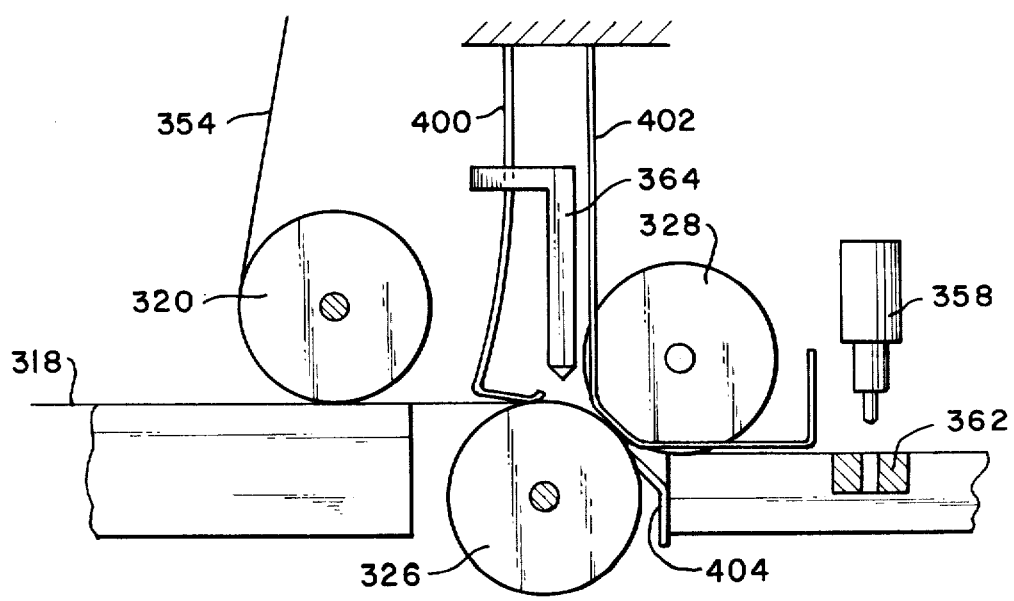
FIG. 25 is an enlarged end view similar to FIG. 11 but with components added.

FIG. 24 shows the operating components just after the third cross seal has been applied to the films 318 and 354 and while the severing operation between the adjacent cross seals is being applied by the severing mechanism 358.

FIG. 24a illustrates a completely sealed package before it is severed from the adjacent to be sealed package.

Figure 24B:
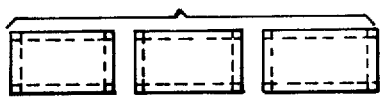
FIG. 24b is a partial plan view of the sealed packages of FIG. 24a in their severed conditions with the next successive package in its relative position.

FIG. 24b shows a series of sealed and severed packages as they leave the severing station 356 for subsequent disposal.

The waste disposal unit is now at rest until a signal is transmitted by the film signa in FIG. 26 to commence a new cycle whereupon the automatic controls of FIG. 26 cause a new cycle to operate in the sequence from FIG. 20 through FIGS. 21, 22, 23 and 24.

As is illustrated in FIG. 9, the right hand end portion of the support base 310 serves as a storage area for the sealed packages after they are severed by the severing mechanism 358.

Inasmuch as the present invention is subject to many modifications and changes in details, it is intended that all matter contained in the foregoing description or shown in the accompanying drawings shall be interpreted as illustrative and not in a limiting sense.

What is claimed is:

1. An animal waste matter disposer unit comprising a generally flat support base having a first portion defining a waste matter receiving station and a second portion defining a packaging station, a storage area associated with said packaging station, said flat support adapted to support an animal on the receiving station, means for positioning a sheet of sealable material extending along a path at said receiving station to form a bed portion where waste matter is received on said sealable material, means for moving said sealable material and said waste matter thereon from said receiving station to said packaging station, means for guiding a sheet of covering material in a first path that angularly intercepts the path of said sheet of sealable material to form a wall portion at said receiving station and then in a second path to overlie said sealable material and said waste matter thereon at said packaging station, said guiding means adapted to position said covering material at said wall portion to also receive waste matter thereon, means for sealing adjacent perimeter edges of said covering material and said sealable material at said packaging station whereby said waste matter is encapsulated therebetween to form a sealed package, and means for moving the sealed package to said storage area.

2. The invention as claimed in claim 1 and further including a housing to cover said packaging station, an opening in said housing to partially expose said covering material at said wall portion prior to its being sealed to said sealable material to form said sealed package.

3. The invention as claimed in claim 2 and further including moisture absorbant material on given parts of said sealable material to absorb moisture from the waste matter deposited thereon, and said means for positioning said sealable material and said covering material adapted to position said given parts of moisture absorbant material at said opening in said housing.

4. The invention as claimed in claim 3 further including moisture absorbant material on given parts of said covering material to absorb moisture from waste matter deposited thereon, and said means for guiding said covering material adapted to place the moisture absorbant material substantially in registry with the moisture absorbing material of said sealing material prior to sealing of adjacent perimeter edges said covering material and said sealing material at said packaging station.

5. The invention as claimed in claim 1 wherein said sealable material is mounted on a reel to define a continuous supply thereof and wherein said covering material is mounted on a roller to define a continuous supply thereof and said sealable material and said covering material have leading edges and wherein joining means initially fastens said edges together and to said means for moving said sealable material to assure unitary movement of the sealable and covering materials from said receiving station to said packaging station.

6. The invention as claimed in claim 5 wherein a storage reel is located in said storage area for receiving a continuous series of sealed packages, said moving means includes a drive roller at one end of said support base, an idler roller at an opposite end of said support base, an endless belt encircling said support base and said rollers and extending from said receiving station through said packaging station to a position adjacent to said storage reel, said endless belt being driven by said drive roller, and wherein an electric motor operates said drive roller for said endless belt and said storage reel at a constant speed.

7. The invention as claimed in claim 6 wherein said sealing means includes a generally reciprocally movable resiliently mounted flat plate disposed over said sealable and covering materials in said packaging station, bracket means fixed to said support base, pin means fixed to said flat plate and cooperating with said bracket means to guide and limit reciprocating vertical movement of said flat plate relative to said support base which is fixedly mounted, an electrically driven rack mechanism carried by said flat plate and cooperating with said support base to effect the reciprocating vertical movement of said flat plate, and an electrically operated sealing wire carried by said flat plate and adapted to first contact said covering material and move the same into engagement with said sealing material after which said sealing wire evenly seals said sealing and covering materials to each other and seal said sealing and covering materials when said resiliently mounted flat plate is moved to its lowermost vertical downward position whereby said waste material is maintained in a given plane throughout its movement from said receiving station to said packaging station.

8. The invention as claimed in claim 5 wherein said storage area includes a portion of said support base, said moving means include a drive roller, an idler roller having a pressure wheel on each end thereof, biasing means biasing said pressure wheels against said idler roller whereby rotation of said drive roller causes said sealable and covering materials to pass between said drive roller and said pressure wheels, an electric motor operates said drive roller, said sealing means includes a cross sealer and a continuous edge sealer on each of said pressure wheels, and wherein said cross sealer comprises an electrically heated cross bar adapted to extend across said sealing and covering materials before engagement by said pressure wheels, and wherein each edge sealer comprises an electrically heated wire to contact and seal each side edge of said sealing and covering materials.

9. The invention as claimed in claim 8 wherein said support base includes a severing mechanism which severs the sealable and covering materials in an area between adjacent sealed packages.

10. The invention as claimed in claim 5 wherein said storage area includes a storage container, wherein said moving means comprises a first endless belt disposed adjacent said storage area, a second endless belt encircling said support base for transporting said sealable and covering materials from said receiving station to said packaging station, said second endless belt having a loop portion angularly displaced upwardly from the plane of the support base and disposed adjacent said first endless belt to transport a sealed package therebetween to said storage container, and wherein an electric motor drives said first and second endless belts at a constant speed.

11. The invention as claimed in claim 1 and further including operating means for sensing the temporary presence of an animal at said receiving station and for energizing said means for moving said sealable material and said waste matter thereon from said receiving station to said packaging station upon the subsequent absence of said animal.

* * * * *